Inventor
K. Takahara

April 19, 1960    KYUE TAKAHARA    2,933,728
ELECTROMAGNETIC WAVE DIRECTION MEASURING SYSTEM
Filed Jan. 3, 1956    11 Sheets-Sheet 3

Inventor
K. Takahara

April 19, 1960  KYUE TAKAHARA  2,933,728
ELECTROMAGNETIC WAVE DIRECTION MEASURING SYSTEM
Filed Jan. 3, 1956
*Fig. 5a*
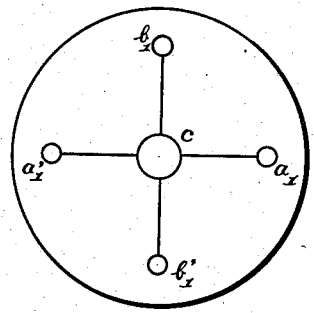
*Fig. 5c*
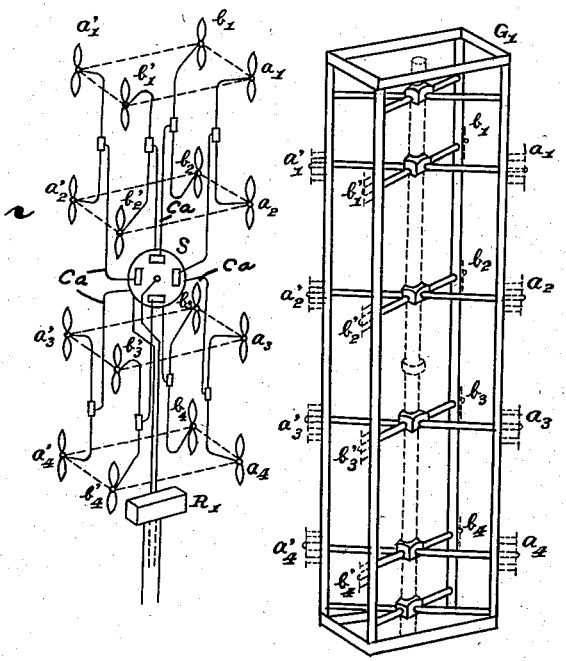
*Fig. 5b*
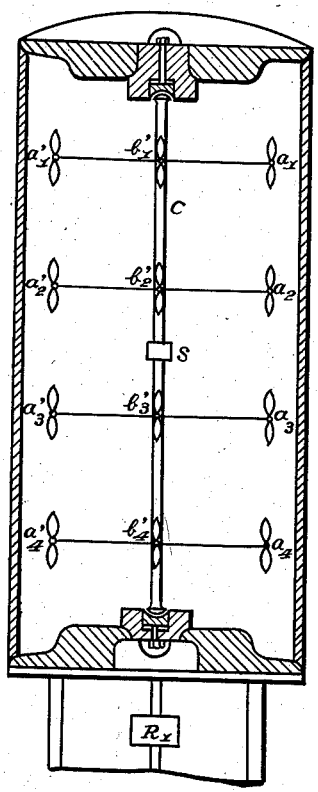
*Fig. 5d*
Inventor
K. Takahara

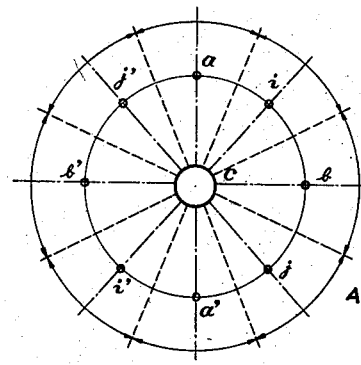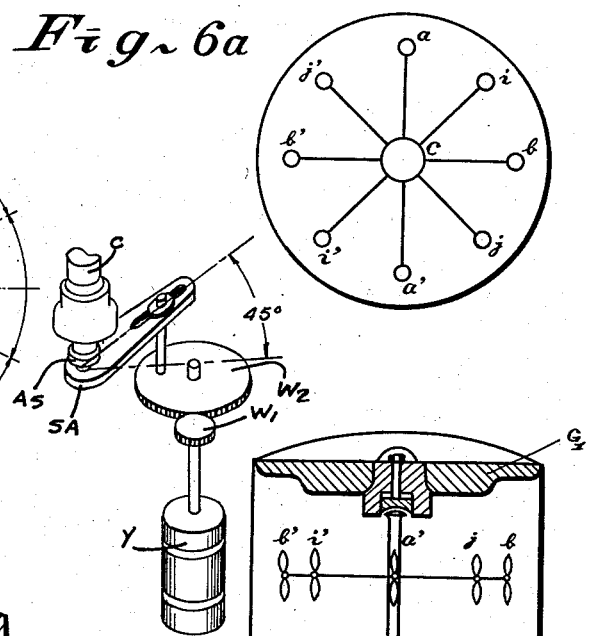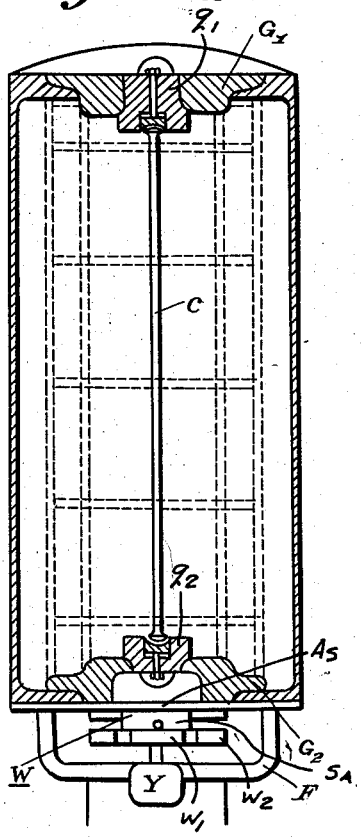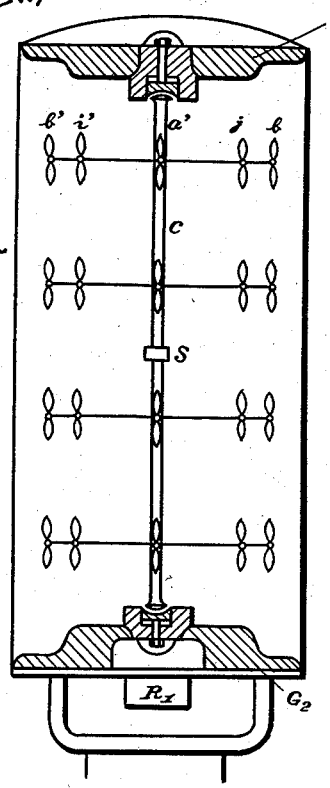

April 19, 1960  KYUE TAKAHARA  2,933,728
ELECTROMAGNETIC WAVE DIRECTION MEASURING SYSTEM
Filed Jan. 3, 1956  11 Sheets-Sheet 6
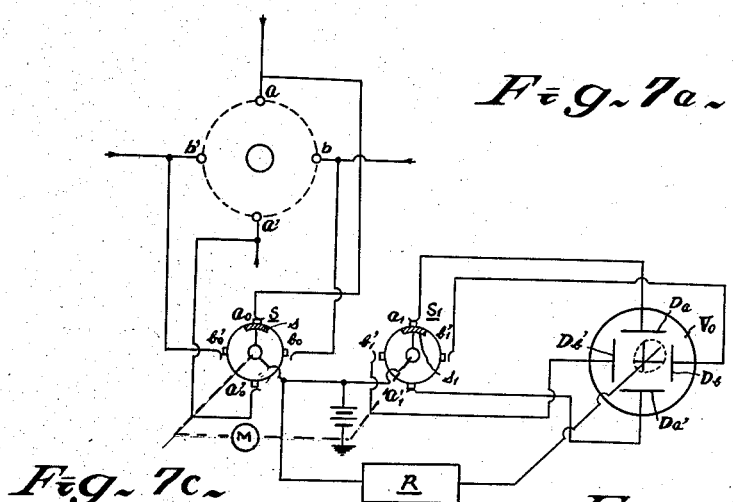
Fig. 7a.
Fig. 7c.  Fig. 7b.
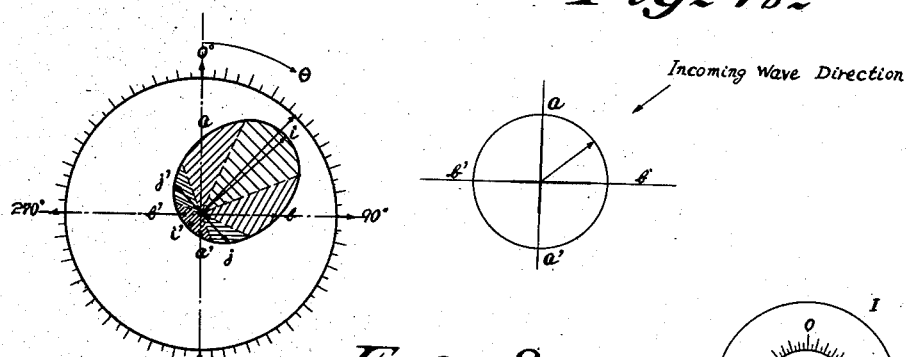
Fig. 8.
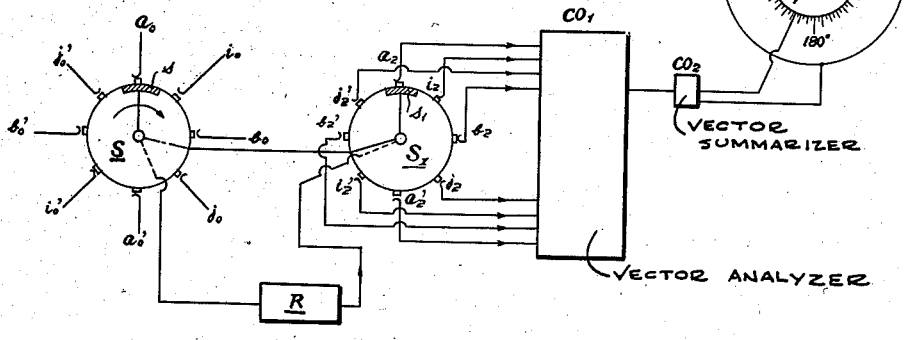
Inventor
K. Takahara Inventor
K. Takahara April 19, 1960  KYUE TAKAHARA  2,933,728
ELECTROMAGNETIC WAVE DIRECTION MEASURING SYSTEM
Filed Jan. 3, 1956  11 Sheets-Sheet 8
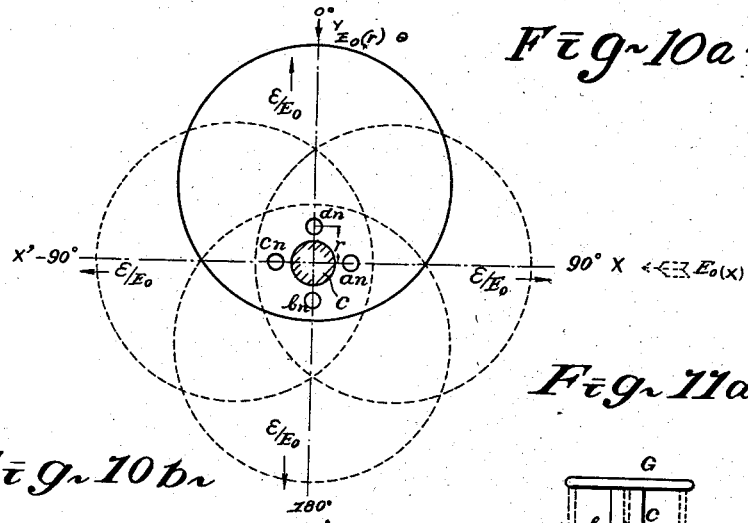
Fig-10a-
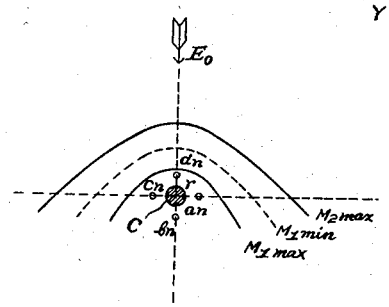
Fig-10b-
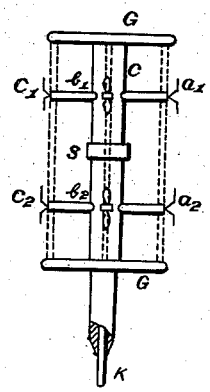
Fig-11a-
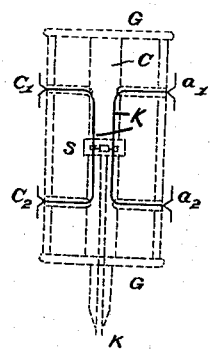
Fig-11b
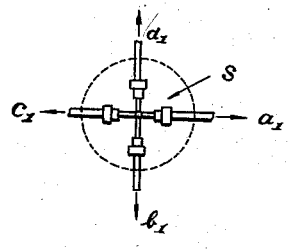
Fig-11c
Inventor
K. Takahara

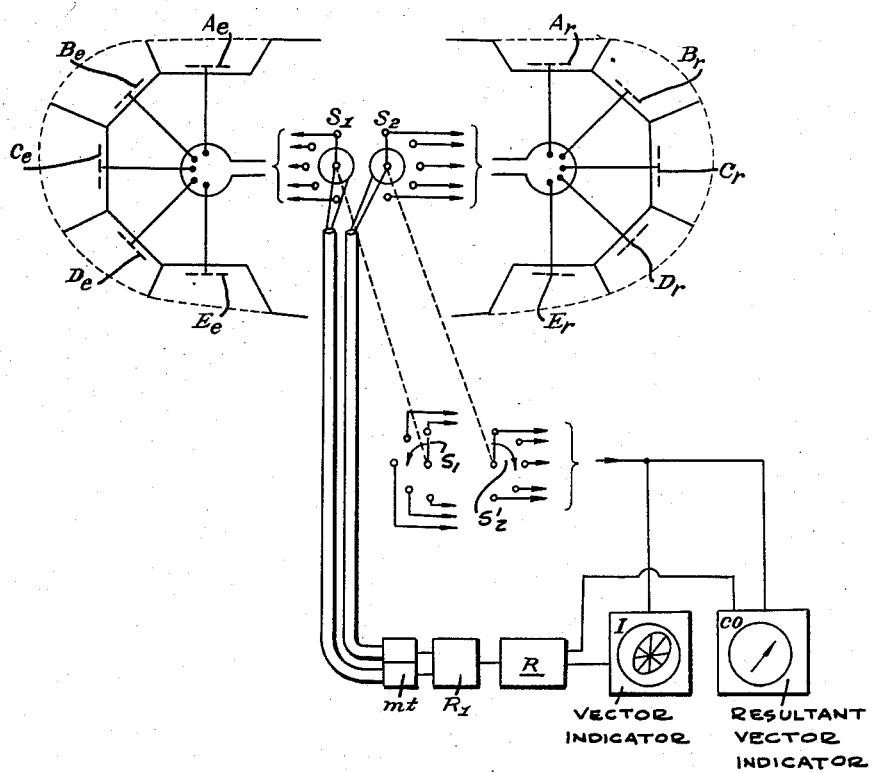

April 19, 1960  KYUE TAKAHARA  2,933,728
ELECTROMAGNETIC WAVE DIRECTION MEASURING SYSTEM
Filed Jan. 3, 1956  11 Sheets-Sheet 11

Inventor
K. Takahara

United States Patent Office 2,933,728
Patented Apr. 19, 1960

2,933,728
ELECTROMAGNETIC WAVE DIRECTION MEASURING SYSTEM

Kyue Takahara, Setagaya-ku, Tokyo-to, Japan, assignor to Tokyo Koku Keiki Kabushiki-Kaisha, Minato-ku, Tokyo-to, Japan Application January 3, 1956, Serial No. 557,196

Claims priority, application Japan January 17, 1955

7 Claims. (Cl. 343—113)

The invention relates to an improved system for measuring an electromagnetic wave.

An object of the present invention is to provide a system for the direct determination of the incoming direction of an electromagnetic energy signal.

Another object of the present invention is to provide a system for the determination of the incoming direction of an electromagnetic wave by utilization of a vector indicating device capable of avoiding the influence of adjacent conductive elements.

A further object of the present invention is to provide a system for the measurement of an electromagnetic wave which necessitates no circuit such as phase compensating circuit, goniometer circuit, frequency compensating circuit and the like and which makes employment of a most stable circuit.

Said objects and other objects of the present invention have been attained by a system comprising the combination of an antenna system composed of one or more reflecting conductors which generate a diffracted wave and one or more pick-up antenna elements which are arranged around said conductor so as to pick up the generated diffracted wave, said element being rotated around the reflecting conductor, or conductors, in case only one element is used, and the circuits of said elements successively closed by successive switching of said circuits, a receiver arranged so as to rectify and amplify the output of the pick-up antenna elements, and an indicator including a device rotated with a speed synchronous to the rotation of said pick-up antenna elements so as to generate a maximum standard voltage in a standard direction, and a device capable of discriminating the phase difference between the rotating output wave of said receiver and said standard maximum wave, the direction of the incoming electric wave being measured by said discrimination.

Other objects and many of the attendant advantages of this invention will clearly be understood by reference to the following description taken in connection with the accompanying drawings, wherein like parts are indicated throughout the several views by the same reference characters, and in which:

Fig. 4b is a vertically sectioned side view of the example illustrated in Fig. 4a.

Fig. 5a is a plan view of an alternative antenna system according to this invention for making observation at four positions.

Fig. 5b is a vertically sectioned side view of the example illustrated in Fig. 5a.

Fig. 5c is a perspective view showing an actual arrangement of the antenna elements illustrated in Figs. 5a and 5b.

Fig. 5d is a perspective view showing an actual frame work of the antenna elements illustrated in Figs. 5a and 5b.

Fig. 6a is a plan view of an antenna system according to this invention for making observation at eight positions.

Fig. 6b is a vertically sectioned side view of the example illustrated in Fig. 6a.

Fig. 6c is a plan view of an antenna system according to this invention which is composed of eight rows of pick-up antenna elements and provided with sector sweeping mechanism.

Fig. 6d is a vertically sectioned side view of the example illustrated in Fig. 6c.

Fig. 6e is a perspective view of the mechanism for swinging the antenna elements of Fig. 6d.

Fig. 7a is a connection diagram of an indicating system for observation at four positions according to this invention, in which the direction of the incoming wave is indicated by vector diagram.

Fig. 7b is a diagrammatic front view of the vector indicator used for the illustration in Fig. 7a.

Fig. 7c is a vector envelope depicted on a cathode ray tube by the diffracted wave intensity picked up by such antenna system provided with pick-up antenna elements capable of observing at eight positions and with a sector-sweeping mechanism as illustrated in Figs. 6c and 6d.

Fig. 8 is a connection diagram of a vector indicating system and an antenna system according to this invention, said antenna system being able to observe at eight positions.

Fig. 9b is a vertically sectioned side view of the illustration in Fig. 9a.

Fig. 10a is a diagrammatic plan view of an antenna system of this invention, in which directive pattern of diffracted wave intensity is described also.

Fig. 10b is a diagram showing characteristic curves of diffracted wave intensity distribution of the antenna system illustrated in Fig. 10a.

Fig. 11a is a diagrammatic side view of a frame work of an antenna system according to this invention.

Fig. 11b is a circuit diagram of the antenna system illustrated in Fig. 11a.

Fig. 11c is a plan view of the switching device to be used in the antenna system illustrated in Figs. 11a and 11b.

Fig. 12b is an enlarged plan and side view of the antenna system of the aircraft shown in Fig. 12a.

Fig. 13 is a connection diagram of the receiving network for the antenna system illustrated in Figs. 12a and 12b.

Fig. 14a is a plan view of an alternative arrangement of the antenna system illustrated in Figs. 12a and 12b; and, Fig. 14b is a side view of the wing illustrated in Fig. 14a.

The system of this invention is based on the utilization of the properties of a diffracted wave field which distributes around a vertical reflecting conductor in case a plane electromagnetic wave impinges upon the conductor.

When any plane electromagnetic wave impinges upon a vertical reflecting conductor, a diffracted wave field will be distributed around said conductor. According to theoretical and experimental results of the properties of said wave field, the following facts $(a)$, $(b)$, $(c)$, $(d)$ and $(e)$ have been introduced.

(a) Referring to the characteristics of standing wave field pattern of diffracted wave intensity distributed around a reflecting conductor:

Intensity of the standing wave field which is distributed around a reflecting conductor within a very short distance from said conductor in the horizontal plane including the center point of said conductor is a resultant of the intensities of the incoming wave and the reflected wave re-radiated from said conductor.

Basic principle of said fact is well known, so that only the theoretical formula of said fact will be given as follows:

$$\epsilon = E_0 e^{jmr \cos\theta}(1 + Ke^{-j\Phi}) \quad (1)$$

wherein:

$\epsilon$: Intensity of diffracted wave field.
$E_0$: Intensity of incoming wave field.
$r$: Distance between center of reflecting conductor and observing point P.
$m$: $2\pi/\lambda$.
$\lambda$: Wave length of incoming wave.
$K$: Intensity ratio of reflected wave to the incoming wave at point P.
$\Phi$: Phase difference of above both waves at point P.
$\theta$: Angle measured from incoming wave direction to observing point P at the center of reflecting conductor.

Figure 1:
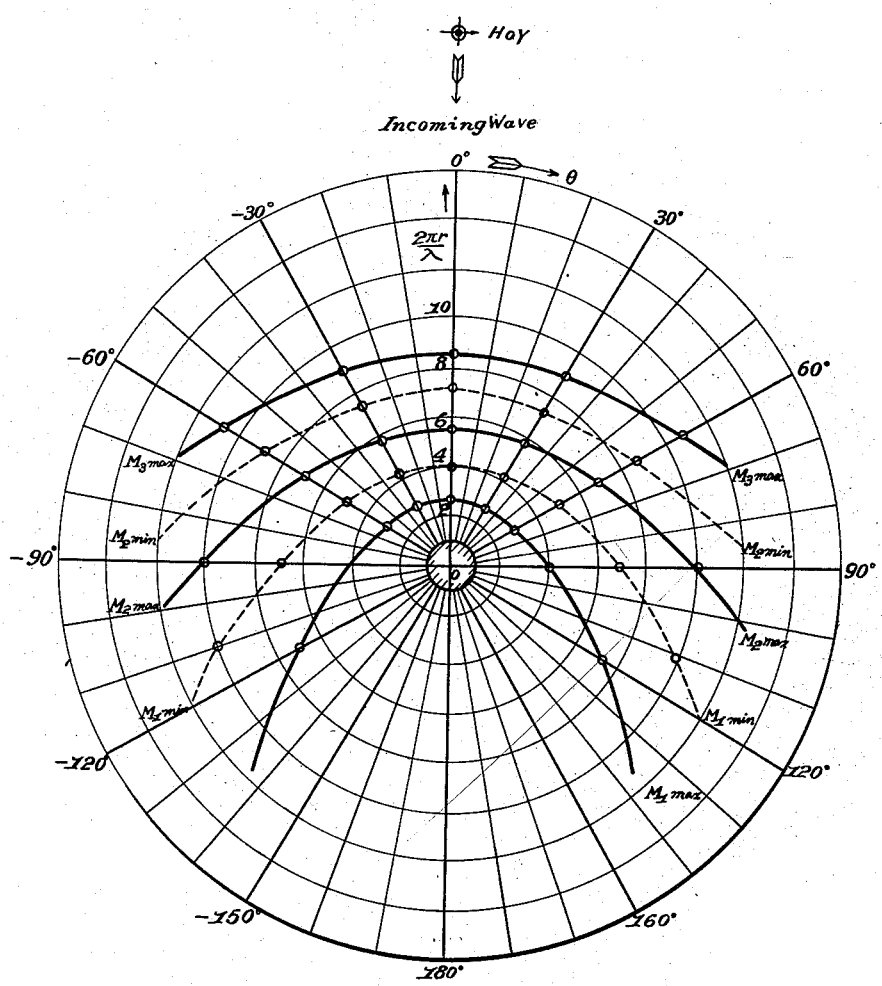
Fig. 1 is characteristic curves showing distribution of diffracted wave field intensity when a reflecting conductor which is sufficiently longer than the wave length of the incoming wave is employed.

In Fig. 1 is shown an example of investigation result of a standing wave field pattern of the diffracted wave distribution obtained by a reflecting conductor which is much longer than the wave length of the incoming wave. It has been experienced that even though the length of conductor is not very long, a pattern which is almost equal to said pattern will be obtained. From Fig. 1, the following facts are pointed out:

(i) The locus lines of maximum values and minimum values of the intensities of the diffracted waves or, in other words, the standing wave field pattern composed of maximum values ($M_1$ max., $M_2$ max. ...) and minimum values ($M_1$ min., $M_2$ min. ...) of the intensities of the diffracted waves form a group of approximate parabolic curves having their center at the middle point of the reflecting conductor.

(ii) The zenith direction of the parabolic curves coincides with the direction of the incoming wave.

(iii) The distance between the maximum value and the minimum value of the diffracted wave field becomes narrowest at the direction of the incoming wave.

Figure 2:
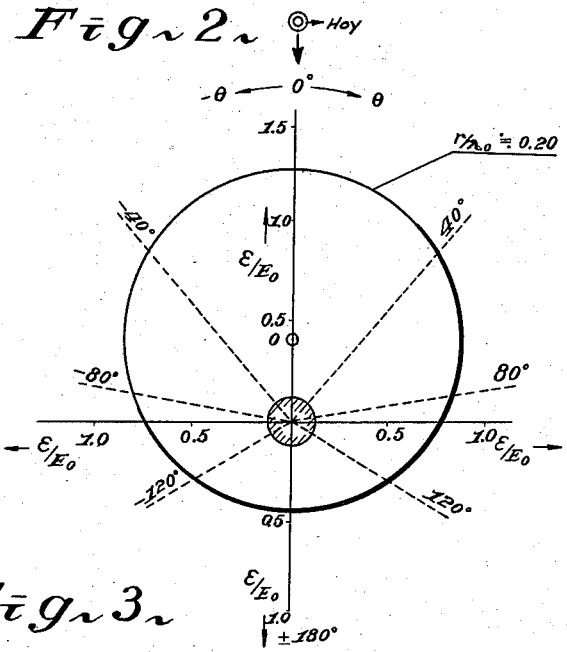
Fig. 2 is a directive pattern of diffracted wave field intensity when a finite reflecting conductor is employed.

(b) Referring to the directivity of a diffracted wave distributed around a reflecting conductor within a very short distance from said conductor:

With regard to such a standing wave field pattern of the diffracted wave distribution as mentioned previously in paragraph (a), the directional characteristic of the diffracted wave intensity within the zone of the first maximum value ($M_1$ max.) is very important for the realization of this invention. For, according to theoretical calculation and results of my experiments, the form of the directive pattern of said intensity around the reflecting conductor becomes circular when the ratio $r/\lambda$ of the distance $r$ between the reflecting conductor and observing point P to the wave length $\lambda$ of the incoming wave is less than 0.2;

Fig. 2 indicates the experimental results of the above directional character obtained when the ratio $(r/\lambda)$ is nearly equal to 0.2 and a reflecting conductor of a finite length is used. As will be understood from Fig. 2, the circular form of said directive pattern is maintained over wide frequency range extending from the top to the bottom of resonant frequency of the reflecting conductor. The intensity of the directive pattern of circular form is maximum in the incoming wave direction and minimum in the reverse direction. This pattern is one of the important characteristics of this invention to determine the incoming wave direction by the vector analysis.

For measuring any electromagnetic wave by utilizing the above mentioned features, in this invention is adopted the method which comprises the steps of observing intensity of the diffracted wave field by exchanging successively the antenna elements which are arranged around a reflecting conductor or conductors and observing directly the direction of the incoming wave by a vector diagram obtained by introducing said observed intensity into a vector indicator capable of indicating the intensity and direction of the incoming wave.

(c) Referring to procedure of vector indicating method:

According to utilization of the fact that the directive pattern of distribution of the diffracted wave intensity is of an approximately circular shape, it is possible to determine the incoming wave direction by the method which comprises the steps of picking up the diffracted wave intensity at different points of pick-up antenna elements arranged around the reflecting conductor, introducing output voltage of each of said antenna elements into a vector analyser to divide the observed values into two components of X direction and Y direction, summing up said former and latter components as $\Sigma X$ and $\Sigma Y$, respectively, and indicating the resultant direction in an indicator.

The resultant value of said values $\Sigma X$ and $\Sigma Y$ is then represented by the following form.

$$\sqrt{\overline{\Sigma X^2} + \overline{\Sigma Y^2}} e^{j\theta}$$

In said value, $\theta$ means a resultant angle corresponding to the resultant direction of those values of the diffracted wave intensities and becomes as follows.

$$\theta = \tan^{-1} \frac{\Sigma X}{\Sigma Y}$$

Said value $\theta$ can be directly obtained by means of an automatic calculating mechanism of the vector analyzer, whereby the direction of the incoming wave can easily be indicated at a dial of indicating element. According to the results of theoretical study, said observed direction perfectly coincides with the theoretically calculated direction of the incoming wave, so that it has been proved that the observed direction data have no error.

(d) Referring to the characteristics of wide-band frequency:

The features of the diffracted wave intensities distributed around a reflecting conductor are almost uniform in their intensities and directivities over wide frequency range extending from top to bottom of the resonant frequency ($f_0$) of the reflecting conductor.

Figure 3:
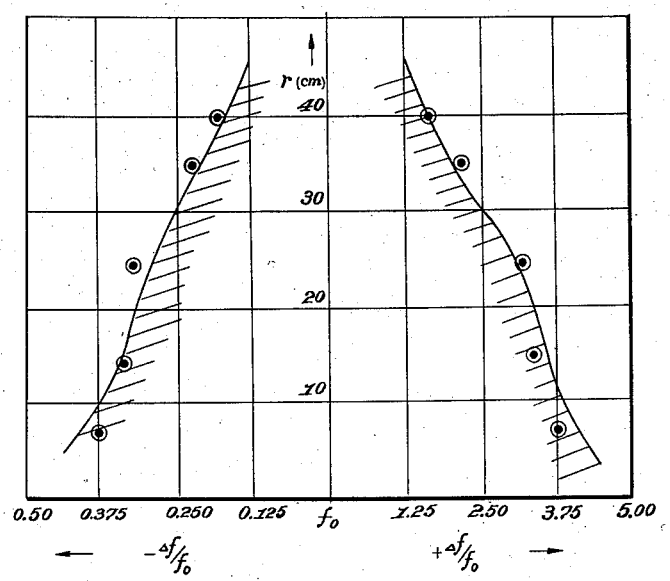
Fig. 3 is an experimental diagram showing the wide frequency characteristics of diffracted wave field.

In Fig. 3 is shown an experimental result of said characteristic, from which being understood the fact that the ratio $$\left( \pm \frac{\Delta f}{f_0} \right)$$

of the band width ($\pm \Delta f$) to the resonant frequency ($f_0$) is between 20% and 35% and the characteristic is almost the same as said frequency range. This very important characteristic is capable of being obtained without use of any complicated and large antenna system, said characteristic having never been expected in the conventional bipole antenna or its combined system.

Therefore, this invention not only simplifies antenna system, but also makes the realization of small type antenna system possible without the accompaniment of any trouble with which radio operators still meet.

(e) Referring to attenuation of diffracted wave intensity:

Although the fact that the field intensity of the reflected secondary wave reradiated from the surface of a reflecting conductor due to current induced in the surface of said conductor attenuates rapidly with the distance from the center of said conductor is already well-known, it is still very important to obtain its attenuation coefficient at a short distance from said conductor. According to experimental results, the attenuation coefficient at a short distance is represented by the following approximate Formula 2:

$$k \doteq \frac{c}{(r/\lambda)n} \quad (2)$$

wherein:

$k$: Intensity ratio of the reflected wave to the incoming wave.
$c$: Constant.
$n$: Exponential coefficient.

In the Formula 2, it is evident that $k$ is attenuated in accordance with the exponential coefficient $n$ and this value $n$ becomes about ½ within the range, in which $(r/\lambda)$ is from 0.10 to 0.50.

From said facts, it can be concluded that if a relation $r_d \gg r$ exists between the distance $r$ of the antenna elements of this invention from the reflecting conductor and the distance $r_d$ of the reflecting conductor from adjacent conductor, that the effect caused by a reflecting wave of the adjacent conductor can effectively be eliminated. In this invention, it is possible to satisfy said condition $r_d \gg r$, because said distance $r$ is generally very little, so that according to the antenna elements of this invention it is possible to reduce remarkably the defective effect due to adjacent conductors, said possibility being an important characteristic in the apparatus for measuring electromagnetic wave.

Up to the present, because of the difficulty in avoiding the influence caused by adjacent conductors, it has been impossible to obtain an efficient result even when an excellent radio set is used. According to the antenna system of this invention, however, said disadvantage has been effectively eliminated by adopting said condition $r_d \gg r$.

The following detailed explanations are the results of various examples of this invention.

(A) *Apparatus for the measurement of the direction of an incoming electromagnetic wave.*—According to this apparatus, an antenna system consisting of many groups of pick-up antenna elements of small type which can observe the diffracted wave intensities distributed around a reflecting conductor is arranged and each output voltage of said antenna elements is led to a receiver by switching successively the output waves of said elements to an indicator.

Said indicator consists of two parts, that is, a network capable of vectorially indicating intensity and direction of the diffracted wave caught by each of the antenna elements and another network capable of analysing said vectorial value into two components of $x$ and $y$ directions and then indicating a resultant value of said intensities after combination of said vectorial values of $x$ and $y$ components to indicate directly the direction of the incoming wave on a dial of an indicator. Said indicator is additionally provided with an auxiliary indicator having a cathode ray tube which indicates the received vector values as the vector diagram and makes it easy to obtain maximum value and direction thereof.

According to said equipment, the vectorial value corresponding to each of the diffracted wave intensities at different points of antenna elements is analyzed and combined as a resultant vector, so that the direction of the incoming wave can be effectively indicated on a dial of the indicator without misindication of reverse direction.

Advantages of said equipment may be put as follows:

(1) It is possible to obtain a reception of wide band frequency.

(2) Due to observation of diffracted wave intensities which are distributed around the reflecting conductor at multi-points, it is possible to obtain a unidirectional measurement of the incoming wave direction.

(3) Directive pattern of diffracted wave intensities which are distributed around the reflecting conductor is a circular shape, so that any vector indicating network can be used to determine the incoming wave direction.

(4) Diffracted wave field is rapidly reduced because of very short distance between the antenna elements and the reflecting conductor, so that effects due to adjacent conductors will be negligible.

(5) Observation of intensity distribution around the reflecting conductor and avoidance of adjusting network such as phase compensator or frequency compensator are possible, so that the networks of the equipment of this invention become very simple and a technically simple radio set may be used.

Figure 4A:
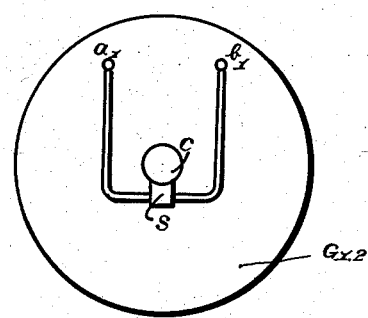
Fig. 4a is a plan view of a V-shaped antenna system for the observation at two positions.
Figure 4B:
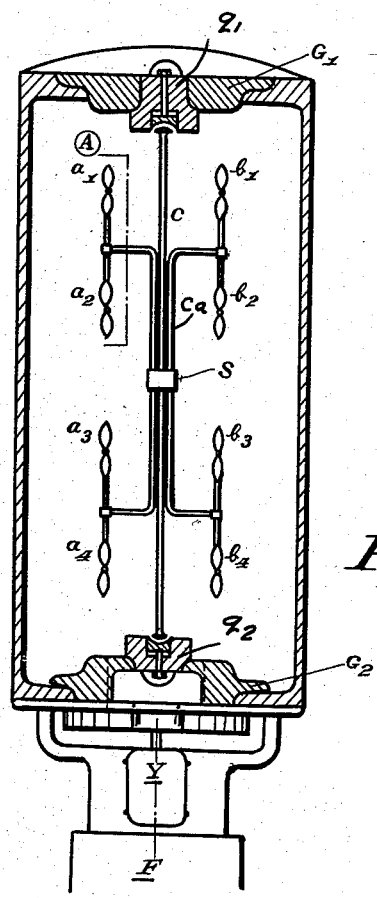
Figure 4C:
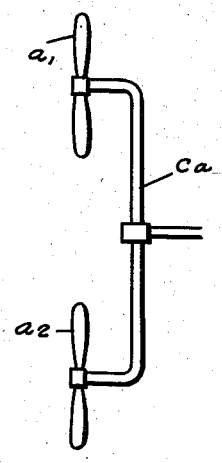
Fig. 4c is an enlarged side view of a pick-up antenna element used in the example illustrated in Figs. 4a and 4b.

In Figs. 4a, 4b, and 4c is shown an example of the antenna system for measuring the incoming wave direction by observing at positions of two-rows of pick-up antenna elements which are located around a reflecting conductor C. Said system consists of a reflecting conductor C fixed at its both ends to rotary members $q_1$ and $q_2$ which are rotatably supported by stationary tables $G_1$ and $G_2$ and two rows of pick-up antenna elements ($a_1$, $a_2$, $a_3$, $a_4$) and ($b_1$, $b_2$, $b_3$, $b_4$) which are connected in U type to a switching member S through high frequency cables $Ca$ at the positions symmetric to said reflecting conductor C, said rotary members being driven at a constant speed by a motor Y attached to the base board F and said switching member being attached to the reflecting conductor C. By switching said member S, each row of said antenna elements is connected to or opened from the receiver which is not shown in Figs. 4a, 4b and 4c and will be explained later. The output voltages of antenna elements ($a_1$, $a_2$, $a_3$, $a_4$) and ($b_1$, $b_2$, $b_3$, $b_4$) are amplified and rectified in said receiver. According to said system, direction of the incoming wave can be indicated by detecting the difference between the output voltages of both rows of said elements ($a_1$, $a_2$, $a_3$, $a_4$) and ($b_1$, $b_2$, $b_3$, $b_4$).

In Figs. 5a and 5b is shown an example of the antenna system provided with four rows of pick-up antenna elements ($a_1$, $a_2$, $a_3$, $a_4$), ($a_1'$, $a_2'$, $a_3'$, $a_4'$), ($b_1$, $b_2$, $b_3$, $b_4$) and ($b_1'$, $b_2'$, $b_3'$, $b_4'$), said rows being located at symmetric positions around the center of a reflecting conductor C. In this system, when vector values of diffracted wave intensities in the four directions are obtained by switching rapidly the output terminals of each of said four rows of antenna elements and then said vector values obtained are introduced into any direction indicator after putting said values in an electrical or mechanical vector analyzer, the direction of the incoming wave can effectively be measured. In Figs. 5a and 5b, the switching member which switches the output terminals of the antenna elements is shown by S and the preamplifier is shown by $R_1$.

In the antenna system of Figs. 5a and 5b, as will be clearly shown in Fig. 5c, the pick-up antenna elements are connected to the switching member S by their respective high frequency cables.

The switching member makes observation of the intensity of the diffracted wave possible by means of connecting one antenna element to the preamplifier $R_1$ by switching successively the output terminals of the antenna elements. The output voltages of said antenna elements are introduced into a vector indicator or vector analyzer through said preamplifier $R_1$ whereby the direction of the incoming wave is determined in a manner as already described.

In Figs. 6a and 6b is shown an antenna system provided with symmetrically arranged eight rows of antenna elements $a$, $b$, $i$, $j$, $a'$, $b'$, $i'$, and $j'$ capable of observing at eight symmetrical positions. According to this example, vector values of the diffracted wave intensities at the symmetrical eight positions around the reflecting conductor C can be obtained, so that an improved measurement better than that in the system illustrated in Figs. 5a and 5b will be obtained.

In this example also, the switching member S for switching successively the output terminals of eight antenna elements is used.

In Figs. 6c and 6d is shown an antenna system provided with symmetrically arranged eight rows of antenna elements and capable of observing at eight symmetrical positions, wherein antenna elements are arranged so as to be rotated within a definite angle by a sector-sweeping mechanism to sweep sectorially the diffracted wave for making the determination of the incoming wave direction easy.

Each of the antenna elements $a$, $b$, $i$, $j$, $a'$, $b'$, $i'$ and $j'$ can be rotated within a definite angle, for example, the antenna element $a$ can be swung within 45° in the clockwise direction and counterclockwise direction from the radial line passing the element $a$ and the reflecting conductor C to make a sector-sweeping. Means for effecting reciprocating sweeping of a predetermined peripheral sector is schematically illustrated in Figs. 6d and 6e in which Y is a driving motor, M is a swing mechanism comprising gear W, an eccentric gear W2, a swing arm SA and an antenna shaft AS.

By said sweeping motions of the antenna elements, an envelope of the directive pattern composed of the diffracted wave intensities will be obtained on a cathode ray tube not shown. The envelope appearing on said tube as above makes it easy to determine the direction of the incoming wave by finding the maximum value of the radius vector. In this example, the antenna elements supported by the rotary members $q_1$ and $q_2$ which are rotatably supported by the stationary tables $G_1$ and $G_2$ can be easily swung in the clockwise and counterclockwise directions from the radial line by means of a swing mechanism W composed of an antenna shaft AS attached to the rotary member $q_2$, a swing arm SA fixed to said shaft, an eccentric gear W2 which oscillates said swing arm when it is rotated, and a gear W1 meshed with said gear W2 to rotate it and being driven by a motor Y arranged on a stationary base F.

An actual example having four observation positions is shown in Figs. 7a and 7b, in which the output terminals $a_0$, $b_0$, $a_0'$, and $b_0'$ of the antenna elements, $a$, $b$, $a'$ and $b'$ are successively connected to the input terminal of the receiver R through a segment $s$ of a rotary switch S, whereby the output voltages at said output terminals are applied to the grid of a cathode ray tube $V_0$ after their successive amplification and detection in said receiver R. Another switch $S_1$ is attached to the rotary shaft of switch S so that the segment $s_1$ of said switch $S_1$ may be synchronized with the segment $s$ of the switch S to close or open the terminals $a_1$, $b_1$, $a_1'$ and $b_1'$ with a switching speed synchronous to that of the terminals $a_0$, $b_0$, $a_0'$ and $b_0'$. Therefore, the voltages are applied to the deflecting plates $D_a$, $D_b$, $D_a'$ and $D_b'$ of said tube $V_0$ with a speed synchronous to that of the terminals $a_0$, $b_0$, $a_0'$ and $b_0'$, so that four vectors corresponding to the intensities of the diffracted wave intercepted by the antenna elements $a$, $b$, $a'$ and $b'$ are indicated on the cathode ray tube as shown in Fig. 7b, whereby the direction of the incoming wave can be unidirectionally determined by vectorial addition of said four vectors.

An envelope of a vector diagram obtained by swinging eight rows of antenna elements within a narrow angle is shown in Fig. 7c. By eight radius vectors corresponding, respectively, to the antenna elements $a$, $b$, $i$, $j$, $a'$, $b'$, $i'$, and $j'$, said vectors being indicated by the corresponding same characters as the antenna elements, an envelope due to the swinging of the antenna elements are indicated on the screen of a cathode ray tube. The direction of maximum radius vector is clearly shown in said envelope whereupon the direction of the incoming wave can be more readily determined than the case of the system having four antenna elements.

The equipment provided with eight antenna elements may be modified as shown in Fig. 8 so as to make direct reading of the direction of the incoming wave possible. In this example, output voltages at terminals $a_0$, $b_0$, $i_0$, $j_0$, $a_0'$, $b_0'$, $i_0'$, $j_0'$ are calculated by a vector analyzing network $CO_1$ and vector summing network $CO_2$ to obtain a resultant vector or maximum radius vector on a dial of an indicator I. A vector analyzer and summarizer such as shown in Patent No. 2,428,800, issued October 14, 1947, may be utilized.

In order to provide input voltage to said network $CO_1$, the induced voltages of the antenna elements are applied to the input terminals of said network $CO_1$ through a rotary switch S, a receiver R and another rotary switch $S_1$. In the rotary switch S, the terminals $a_0$, $b_0$, $i_0$, $j_0$, $a_0'$, $b_0'$, $i_0'$ and $j_0'$ are successively connected to the receiver R through a segment $s$ and in the rotary switch $S_1$ the output terminal of said receiver is connected to the input terminals of the network $CO_1$ through a segments $s_1$ of the switch $S_1$. Each output voltage of the output terminals $a_2$, $b_2$, $i_2$, $j_2$, $a_2'$, $b_2'$, $i_2'$ and $j_2'$ of said switch $S_1$ is analyzed into X and Y components in the vector analyzing network $CO_1$ and then said components are vectorially summed up in the network $CO_2$ to obtain $\Sigma X$ and $\Sigma Y$. Resultant vectors $\Sigma X$ and $\Sigma Y$ are applied to the indicator I, the resultant angle of the resultant vector in said indicator being given by the following equation.

$$\theta = \tan^{-1} \frac{\Sigma X}{\Sigma Y}$$

As said angle value is indicated on a dial needle of said indicator, the direction of the incoming wave can be easily understood.

Figure 9A:
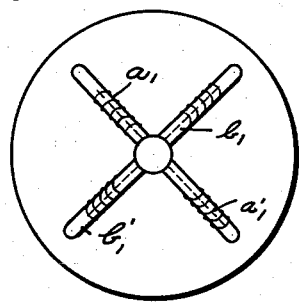
Fig. 9a is a plan view of a pick-up antenna system according to this invention, in which each of the antenna elements is provided with a high frequency magnetic core.
Figure 9C:
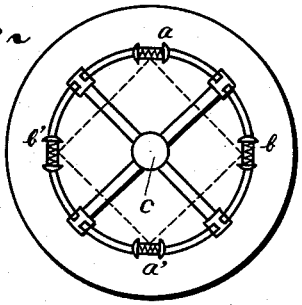
Fig. 9c is a plan view of another example similar to the illustration in Figs. 9a and 9b.
Figure 9B:
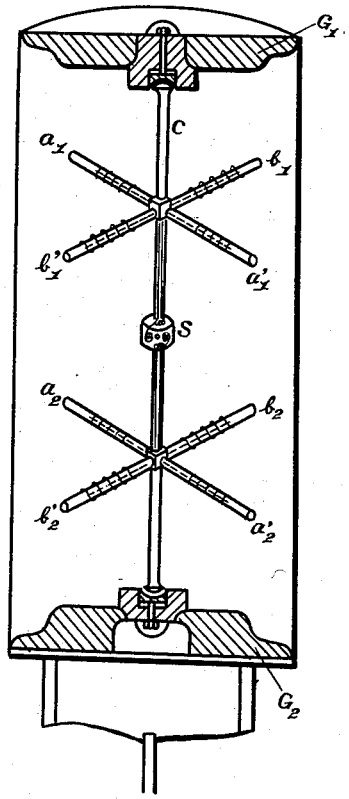

Figs. 9a and 9b relate to an antenna system provided with high frequency magnetic cores which take part in concentrating the magnetic flux density of the incoming electromagnetic wave field, said concentration increasing the catching efficiency of the antenna elements.

In the example of Figs. 9a and 9b, axes of the magnetic cores of the antenna elements $a_1$, $a_1'$, $b_1$, $b_1'$, $a_2$, $a_2'$, $b_2$ and $b_2'$ are radially arranged from the center of a reflecting conductor C, said conductor C being supported by rotary plates $G_1$ and $G_2$ at both ends and a switch S being supported by said conductor. The example of Figs. 9a and 9b relates to an antenna system having four observing positions, but may be applied for other systems which are designed to make observation at two, six, eight or more positions.

Figure 9D:
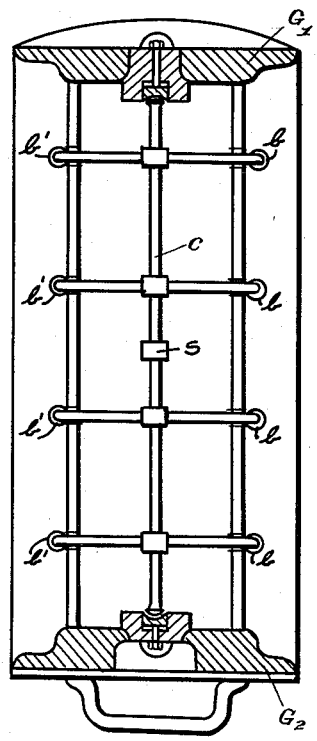
Fig. 9d is a side view of the illustration in Fig. 9c.

The antenna system shown in Figs. 9c and 9d relates to the case, in which magnetic cores of the antenna elements $a$, $a'$, $b$ and $b'$ are arranged along a circle having its center point at the axis of the reflecting conductor C which is supported by rotary plates $G_1$ and $G_2$.

The structure and operation of said systems employing magnetic cores are quite the same as the systems mentioned already in connection with Figs. 5a, 5b, 6a, 6b, 6c and 6d.

(B) *Wide range receiving antenna system.*—As will be understood from the investigation results which have been described hereinbefore, diffracted wave field distributes just around a reflecting conductor, said field has the same characteristics within a wide frequency range having a center frequency which is equal to the resonant frequency of the reflecting conductor and the intensity of said field is an approximate circular pattern having maximum intensity at the incoming wave direction and minimum intensity at the opposite direction.

By utilizing said features, it has become possible to obtain a wide range receiving antenna system of relatively small type, in which an accurate measurement ranging over frequencies of wide band is possible and the equipment is very convenient for treatment and arrangement. This antenna system consists of a reflecting conductor located at the center position and pick-up antenna elements arranged around said conductor. In this system, the output voltages induced in the pick-up antenna elements are applied to a receiver set through respective high frequency cables and a switching member capable of connecting any row of said antenna elements to said receiver set. For example, when an antenna system consisting of a reflecting conductor and four rows of pick-up antenna elements which are arranged symmetrically at the same space and same distance from the center axis of said conductor is adopted, only the row of the antenna elements facing the incoming wave direction is connected to the receiver set by a switching member and the other rows are left open, whereby we can obtain a sufficiently sensitive reception of the incoming wave coming from any direction or having any frequency. The principle of said antenna system will be described in connection with Figs. 10a and 10b, in which a reflecting conductor, pick-up antenna elements and distance between conductor C and each of said antenna elements are, respectively, indicated by C, $a_n$, $b_n$, $c_n$, $d_n$, and $r$. In said figures is shown a fact that output voltage of the pick-up antenna element directed to the incoming wave direction is maximum. From said fact, we can obtain a sufficiently sensitive reception of the incoming wave having a frequency belonging to a wide band ranging the frequencies higher and lower than the resonant frequency by suitable selection of the value $r$.

For instance, we can obtain almost equisensitive output of the diffracted field intensity without relation to the incoming wave directions by closing the antenna element $d_n$ by the switching member when the incoming wave comes from the direction Y and by closing the antenna element $a_n$ when said wave comes from the direction X.

An actual construction of an antenna system suitable for the above purpose is shown in Figs. 11a, 11b and 11c, in which a reflecting conductor C is designed so as to correspond to a given range of receiving frequency band, said conductor C and pick-up antenna elements $a_1$, $a_2$, $b_1$, $b_2$, $c_1$, $c_2$, $d_1$ and $d_2$ are supported by frame works G, said antenna elements are connected so as to be closed and opened by a switching member S in accordance with the direction of the incoming wave, and high frequency cables $k$ are used to connect the antenna elements to the input terminals of the receiver set not shown.

(C) *Example of this invention which is suitable for aircraft.*—This example relates to an equipment applicable for measuring the incoming wave direction in an aircraft. In the equipment to be provided in an aircraft, there are very difficult problems, particularly it should be avoided as much as possible to stretch antenna elements outside the body and wings.

Figure 12A:
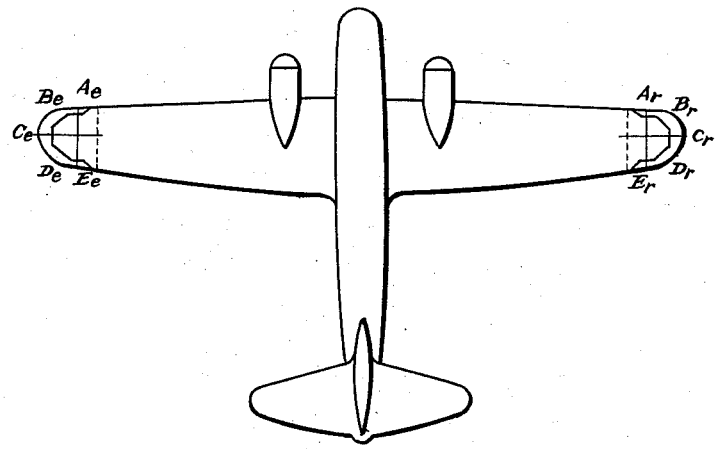
Fig. 12a is a plan view of an aircraft provided with an antenna system in accordance with this invention.
Figure 12B:
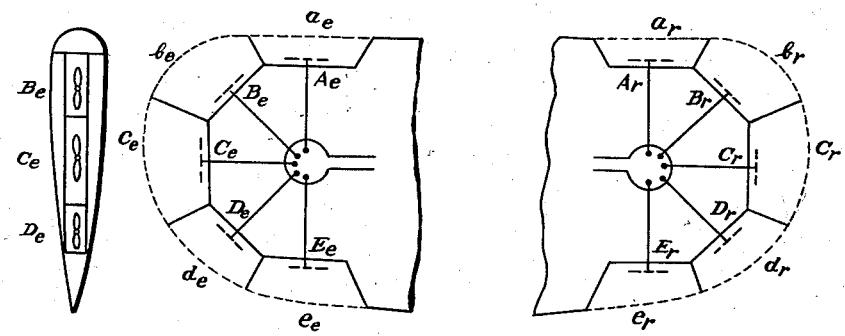

An actual example of said equipment is shown in Figs. 12a and 12b, in which each of the antenna systems consists of half-octal reflecting plates made of wing end and pick-up antenna elements which are located in the front of said plates at a short distance, one of said antenna systems being arranged at the position near the right wing end and another at the position near the left wing end. In this example, the direction of the incoming wave is measured by indicating the intensity of the diffracted wave obtained by switching ten different antenna elements through a vector analyzing or vector summarizing indicator such as described already, five of said antenna elements being arranged at the left wing end and the other five being arranged at the opposite wing end.

In Figs. 12a and 12b, half-octal reflecting plates $A_e$, $B_e$, $C_e$, $D_e$ and $E_e$ of left side are arranged so that the plate $A_e$ faces the direction of nose, $E_e$ faces the opposite direction and there is an angle of 45° between two adjacent plates of said plates. The pick-up antenna elements $a_e$, $b_e$, $c_e$, $d_e$ and $e_e$ are, respectively, attached to the plates $A_e$, $B_e$, $C_e$, $D_e$ and $E_e$ at a short distance. When any incoming wave comes to said reflecting plates, diffracted wave field is distributed just around the reflecting plates by the resultant wave of the incoming wave and the reflected wave reflected from said reflecting plates.

The output voltages of the antenna elements are transmitted to the receiver set in the radio room by high frequency cables through a switching member which closes successively said cables.

On the right side end of the wing is arranged the same antenna system as that on the left side end and the members indicated by $A_r$, $B_r$, $C_r$, $D_r$, $E_r$, $a_r$, $b_r$, $c_r$, $d_r$ and $e_r$ correspond to those indicated by $A_e$ ... $E_e$ and and $a_e$ ... $e_e$, respectively.

Each of said antenna systems is protected by plastic cover shown by the broken line in Fig. 12b.

A receiving circuit to be combined with the antenna systems described in connection with Figs. 12a and 12b is shown in Fig. 13, in which the output voltages picked up at the antenna elements arranged on the both ends of the wing are first applied to the switching members $S_1$ and $S_2$ arranged at the center part of fuselage through high frequency cables. The switching member $S_1$ is inserted between the left side antenna elements and a matching member $mt$ and the switching member $S_2$ is inserted between the right side antenna elements and said matching member $mt$. Both kinds of the output voltages induced in the antenna elements of both sides are preadjusted in the matching member $mt$ and then transmitted to a receiver R through a preamplifier $R_1$. One part of the output voltage of the receiver R is led to a vector indicator I and another part to a resultant vector indicator CO. The switching members $S_1'$ and $S_2'$ are the same as the switching members $S_1$ in Figs. 7a and 8. The direction of maximum intensity and the direction of the incoming wave are determined by the vector indicator I and vector analyzer, respectively.

Figure 14A:
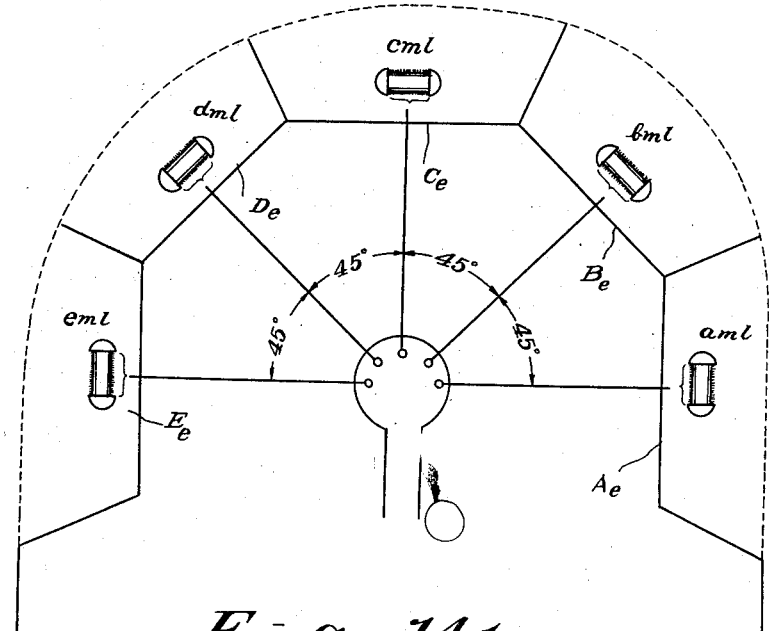
Figure 14B:
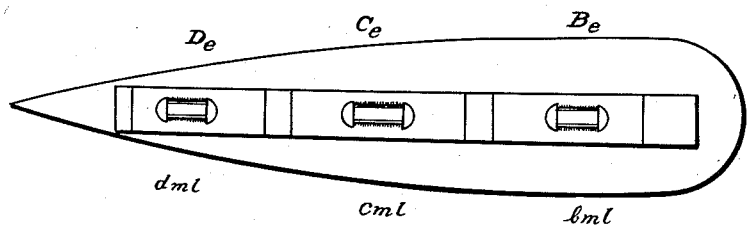

In Figs. 14a and 14b is shown an example of an antenna system of this invention which is suitable for determining the direction of the incoming wave of short band. In said system high frequency magnetic cores are combined with the pick-up antenna elements as described in Figs. 12a and 12b, in which each of the pick-up antenna coils $am1$, $bm1$, $cm1$, $dm1$ and $em1$ is provided with a respective magnetic core and the diffracted wave fields produced by the reflecting plates $A_e$, $B_e$, $C_e$, $D_e$ and $E_e$ are picked up by said antenna coils. The output voltages of said antenna coils are transmitted to a receiver through a switching member and the output of said receiver is led into an indicator in the same manner as the example of Figs. 12a and 12b, said member, receiver and indicator being installed in the center room of fuselage.

While I have described some particular embodiments of my invention, it will, of course, be understood that this invention is not limited thereto, since many modifications may be made without departing the spirit and scope of this invention.

I claim:

1. An electromagnetic wave direction measuring system comprising a vertical reflecting conductor for developing a diffracted wave having an intensity distribution correlative to the direction of an impinging electromagnetic wave, a plurality of pick-up antennas annularly arranged about said reflecting conductor for detecting a portion of said diffracted wave, each of said antennas being at a radius $r$ substantially equal to $0.2\lambda$ where $\lambda$ is the wavelength of said impinging wave, each of said antennas being at a distance $r_d$ from one another substantially larger than said radius $r$, circuit means for sequentially rectifying and amplifying the diffracted wave detected by each of said antennas, and indicating circuit means responsive to the difference between said sequentially rectified and amplified diffracted wave detected by each of said antennas thereby to indicate the direction of said electromagnetic wave.

2. An electromagnetic wave direction measuring system according to claim 1 and including high frequency magnetic cores associated with each of said plurality of pick-up antennas.

3. An electromagnetic wave direction measuring system according to claim 1 and further including means for effecting reciprocating sweeping of a predetermined peripheral sector about said reflecting conductor.

4. An electromagnetic wave direction measuring system comprising a vertical reflecting conductor for developing a diffracted wave having an intensity distribution correlative to the direction of an impinging electromagnetic wave, a multiplicity of pick-up antennas annularly arranged about said reflecting conductor for detecting a portion of said diffracted wave, each of said antennas being at a radius $r$ substantially equal to $0.2\lambda$ where $\lambda$ is the wavelength of said impinging wave, each of said antennas also being at a distance $r_d$ from one another substantially larger than said radius $r$, circuit means for sequentially rectifying and amplifying the diffracted wave detected by each of said antennas, vector analyzer means, circuit switching means operative simultaneously with the circuit means for feeding to said vector analyzer means the rectified and amplified output signal of said circuit means, vector summarizing means for developing a resultant vector signal from a summation of the X and Y signal components in the output signal of said vector analyzer means, and electroresponsive means responsive to said resultant vector signal for indicating the direction of impingement of said electromagnetic wave.

5. An electromagnetic wave direction measuring system according to claim 4 and including high frequency magnetic cores positioned on each of said multiplicity of pick-up antennas.

6. An electromagnetic wave direction measuring system according to claim 5 wherein said high frequency magnetic cores are positioned on said pick-up antennas in a radial direction relative to said reflecting conductor.

7. An electromagnetic wive direction measuring system according to claim 5 wherein said high frequency magnetic cores are positioned on said pick-up antennas in a circumferential direction relative to said reflecting conductor.

References Cited in the file of this patent

UNITED STATES PATENTS

| | | |
|---|---|---|
| 2,539,413 | Fischer | Jan. 30, 1951 |
| 2,651,774 | Earp | Sept. 8, 1953 |